United States Patent Office.

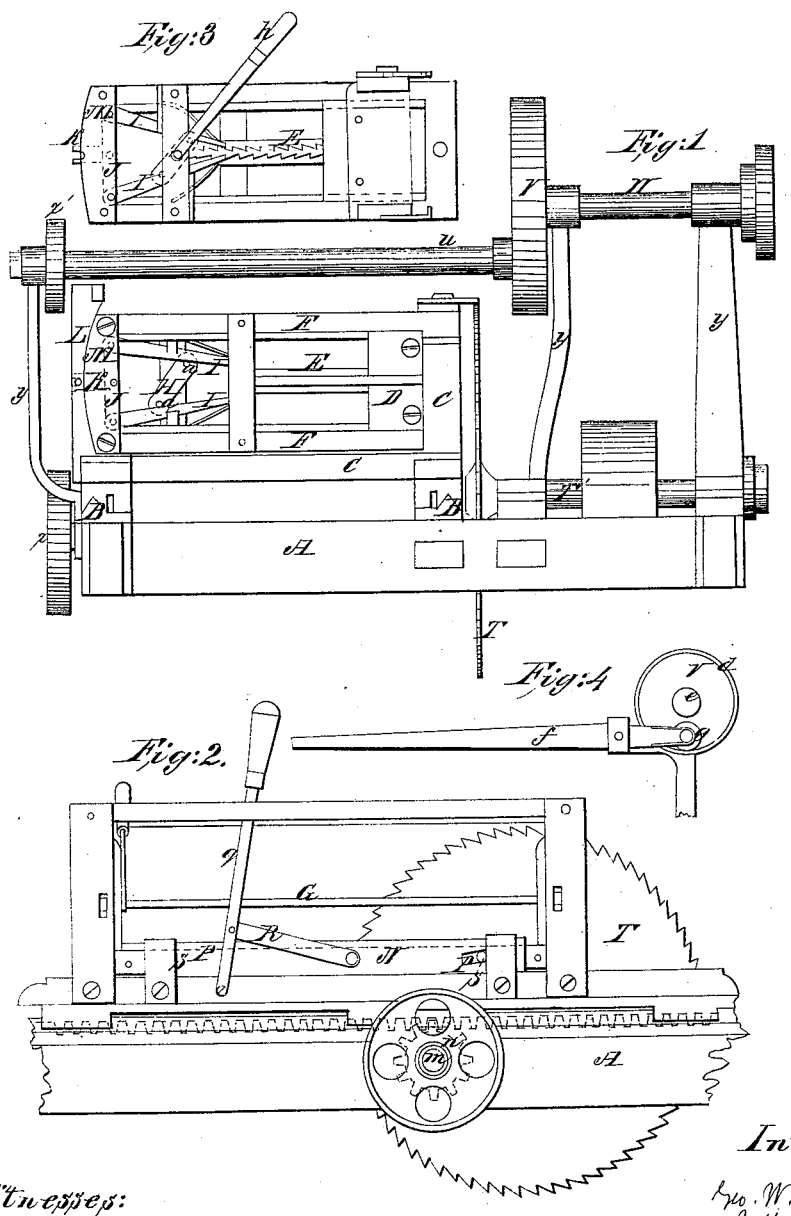

GEORGE W. SOUTHWICK AND JOHN H. GILLETT, OF SCOTT, NEW YORK.

Letters Patent No. 77,776, dated May 12, 1868; antedated May 4, 1868.

---

IMPROVEMENT IN SHINGLE-MACHINES.

---

*The Schedule referred to in these Letters Patent and making part of the same.*

---

TO ALL WHOM IT MAY CONCERN:

Be it known that we, GEORGE W. SOUTHWICK and JOHN H. GILLETT, of the town of Scott, in the county of Cortland, and in the State of New York, have invented certain new and useful Improvements in Shingle-Machines; and do hereby declare that the following is a full, clear, and exact description thereof, reference being had to the accompanying drawings, and to the letters of reference marked thereon.

In the annexed drawings, making part of this specification, A represents the frame of the machine, which is provided with three uprights or standards, $y\ y\ y$, for supporting the shafts $u$ and $w$, and also with two V-shaped ways, B B, placed parallel to each other, a suitable distance apart, for the carriage to move upon. C represents the carriage, which has grooves upon its under side, to fit upon the ways B B, and has also two rack-bars by the side of these grooves, the teeth of which extend downward.

A shaft, $m$, lies crosswise of the frame A, having its bearings in said frame, and provided near each end with a pinion, which gears into the rack-bars of the carriage. The revolving of this shaft $m$ with its pinions causes the carriage to move backwards and forwards upon the frame, as will be described. Placed within the carriage is a frame, with head-block for holding the blocks of which the shingles are to be sawed. This frame slides crosswise of the carriage, upon suitable ways, made to support it, and is provided at each end with the bars E, which have ratchet-teeth upon their under and upper sides, as seen. These bars E are operated by the dogs I I, there being two dogs to each bar, one operating on the under, and the other upon the upper ratchet, with their loose ends. Their other ends are pivoted to each end of a bar, J. The bar J is pivoted at its centre, and, oscillating, causes the dogs I I to operate alternately upon the ratchet-bars E. An arm, K, is secured to bar J at its centre, and serves to oscillate it. These bars K are secured in the end-pieces M of the ways F F, between which the frame D slides, and are provided at their ends with a slot, as seen, into which passes a pin, which said pin passes through standard L of the carriage.

The ways F F are connected at their rear ends by a cross-piece, in which are two pins, S S. These pins play through the inclined grooves P P, in a bar, N. A lever, $q$, gives, through its connection R, an endwise movement to bar N, which causes the pins S S to slide up the inclined grooves P P, and thus elevate slightly the bar connecting the two ways F. The upward movement of this bar causes the bar J, through its arm K, to oscillate, and thus cause the dogs I I to move the rack-bars E. These rack-bars being connected to the head-blocks which carry the shingle-blocks, said blocks are thus moved up to the saw.

The rising and falling of the bar, in which the pins S S are secured, cause both of the dogs I to operate on the under and upper sides of the bars E.

G represents a shaft, which lies longitudinally of the carriage, and which is partially rotated backwards and forwards by a lever, $h$. Near each end of this shaft is secured an arm, H, in which are fixed pins $a\ a$, which serve to separate, when desirable, the dogs I I, to keep them from catching in the bars E.

T represents the saw, and T' the saw-shaft, which has its bearings in the frame A.

U and W represent shafts, which have their bearings in the standards Y. Shaft U has at one end a small drum, $x'$, from which a band passes to pulley or drum $x$, on the shaft $m$, which moves the carriage. Shaft W has on one end a drum, V, which has a recess formed in one face, leaving a rim, $d$, at its periphery, and at its centre a small drum or pulley, $e$. A roller, $g$, on one end of shaft U, lies in the recess of pulley V, between the pulley $e$ and the rim $d$.

$f$ represents a lever-handle, which is connected at one end to the shaft $m$.

When the handle $f$ presses the roller $g$ against the pulley $e$, the shaft $m$ moves in one direction, but when it presses it against the rim $d$, it revolves in an opposite direction. Thus the operator, by moving the handle $f$ up or down, can cause the carriage, through its connections with this handle and the roller or pulley $e$, to move either toward the saw or from it, moving said carriage backward or forward at will by the same lever. The shingle-blocks are moved toward the saw, by means of lever $q$, as has been described.

Having thus fully described our invention, what we claim as new, and desire to secure by Letters Patent, is—

The arrangement of the bar N, with its grooves P P, through which pass the pins S S, said bar being operated by the lever $q$ for oscillating the bar J through its arm K, substantially as and for the purposes specified.

In testimony that we claim the foregoing, we have hereunto set our hands, this 31st day of August, 1867.

GEORGE W. SOUTHWICK,
JOHN H. GILLETT.

Witnesses:
HARVEY ANTHONY,
J. E. BABCOCK.